United States Patent [19]

Shiozawa et al.

[11] 4,321,448
[45] Mar. 23, 1982

[54] METHOD OF AND APPARATUS FOR WELDING METAL BARS

[75] Inventors: Kaoru Shiozawa; Tsunebumi Matsunaga, both of Ichihara, Japan

[73] Assignees: Kajima Corporation; Mitsui Engineering & Shipbuilding Co., Ltd., both of Tokyo, Japan

[21] Appl. No.: 163,075

[22] Filed: Jun. 26, 1980

[30] Foreign Application Priority Data

Jul. 11, 1979 [JP] Japan .................. 54-87686

[51] Int. Cl.³ .................. B23K 9/225; B23K 37/06
[52] U.S. Cl. .................. 219/57; 219/58; 219/160; 219/73.1; 228/265; 140/112
[58] Field of Search .................. 219/51, 52, 56, 57, 219/58, 73.1, 106, 152, 158, 160; 228/189, 265; 140/112

[56] References Cited

U.S. PATENT DOCUMENTS

| | | | |
|---|---|---|---|
| 2,348,087 | 5/1944 | Miller | 219/51 |
| 3,171,013 | 2/1965 | Danhier | 228/189 X |
| 3,694,613 | 9/1972 | Ballard et al. | 219/57 X |
| 3,892,939 | 7/1975 | Medley | 219/57 X |
| 4,094,453 | 6/1978 | Cook et al. | 228/265 |

FOREIGN PATENT DOCUMENTS

54-17342 2/1979 Japan .................. 219/160

*Primary Examiner*—J. V. Truhe
*Assistant Examiner*—Keith E. George
*Attorney, Agent, or Firm*—Armstrong, Nikaido, Marmelstein & Kubovcik

[57] ABSTRACT

A welding method in which two metal bars are disposed such that the opposing ends of these bars are placed in a welding mold with a predetermined welding gap preserved therebetween, and are jointed to each other by filling the space formed between the opposing ends of the bars and the inner surface of the welding mold with a molten welding metal. Also, disclosed is a welding apparatus having a welding gap setting device for placing the metal bars with a predetermined welding gap therebetween and an arc welder for jointing the bars by filling the welding gap with molten welding metal.

4 Claims, 20 Drawing Figures

METHOD OF AND APPARATUS FOR WELDING METAL BARS

BACKGROUND OF THE INVENTION

1. Field of the Invention

The present invention relates to a method of and apparatus for welding metallic materials of predetermined sizes in a continuous linear state as a preceding step for cutting into desired lengths or bending rod-like metallic material such as metal bars or rods, metal pipes, metal plates or the like.

2. Description of the Prior Art

In general, there are two types of material for the bar steel for reinforcement of concrete (hereinafter, the metallic material will be described as reinforcement steel for concrete): namely, a coiled material and a linear material cut into a predetermined size. The reinforcement steel bar is cut and processed into various sizes and shapes before it is placed in the concrete. When the material is a coiled one, the material is cut into a predetermined length after straightening into a linear state by a straightening machine. In this case, therefore, it is necessary to use a specific straightening machine, although the generation of waste material is avoided advantageously. In addition, the straightening machine is required to have a large and tough construction when the diameter of the material is 19 mm or greater. Also, in such a case, a large power is required for the straighening and the fine projections on the reinforcement steel bar are collapsed to spoil the reinforcement performance inherently required for the reinforcement steel bar. Therefore, the coiled material is not used when the diameter of the bar exceeds 19 mm. Thus, when the diameter of the reinforcement steel bar exceeds 19 mm, it is necessary to use linear material of predetermined size, typically 5 to 10 meters. Since the cutting length varies largely depending on the demand, residual materials or waste is inevitably produced. The amount of waste material is significantly large.

In order to avoid this waste of material, it is considered to weld the materials of predetermined sizes into a continuous linear state by various methods such as flush welding, pressure welding using high-frequency heating or pressure welding by means of gas. The flush welding and high-frequency welding, however, require a specific electric power source, while the pressure welding by gas takes an impractically long working time. These welding methods, therefore, cannot be successfully used when the production amount is large as in the case of reinforcement bar, in both aspects of economy and efficiency.

SUMMARY OF THE INVENTION

Objects of the Invention

It is, therefore, an object of the invention to provide a welding method and apparatus suitable for a mass-production of reinforcement steel bars, even when the strainght or linear material of a predetermined size is used, by making it possible to obtain continuous straight material economically and efficiently.

Another object of the invention is to provide a method of and apparatus for welding two metal bars to each other by arc welding, through filling the gap between opposing ends of these bars with a molten metal.

Another object of the invention is to provide a small sized welding apparatus which permits metal bars to be welded simply and economically.

A further object of the invention is to provide a welding method and apparatus which affords a welding with good appearance and sufficiently high strength.

Brief Summary of the Invention

To these ends, according to an aspect of the invention, there is provided a welding method for welding two metallic materials such as metal bars at their opposing ends having the steps of disposing the opposing ends of the metal bars in mold with a predetermined welding gap preserved therebetween and welding these metal bars at the opposing ends by arc welding through filling the welding gap with molten metal.

According to another aspect of the invention, there is provided a welding apparatus for welding two metal bars at their ends, characterized by comprising a mold having a groove for supporting the ends of the metal bars, means for forming a predetermined welding gap between the ends of the metal bars and an arc welder.

BRIEF DESCRIPTION OF THE DRAWINGS

FIGS. 7-a, 7-b and 7-c are illustrations of states of operation of the molding frame of upper and lower sides;

FIGS. 8-a, 8-b, 8-c, 8-d, 8-e and 8-f are illustrations of operation of the apparatus of the invention;

DESCRIPTION OF THE PREFERRED EMBODIMENTS

The preferred embodiments of the invention will be described hereinunder with reference to the accompanying drawings.

The state of welding metal bars in accordance with the invention will be described first with specific reference to FIG. 1. Straight metal bars such as reinforcement steel bars of a predetermined size are arrayed linearly in a manner shown in FIG. 1, and a welding gap 2 is formed between the opposing end surfaces of the reinforcement steel bars. The cylindrical gap defined by the welding gap 2 and the peripheral ridges 3,3 of the reinforcement steel bars 1 is filled with a molten metal 4 by an arc welding to the diameter of the annular projections 3 to weld the front and rear reinforcement bars 1,1 in a linear state. By so doing, the periphery of the ends of the steel bars 1, i.e. the end portion of each steel bar between the axial end surface and the annular ridge 3 is completely enclosed by the molten metal to ensure the necessary tensile and bending strength.

Hereinunder, a description will be made as to a welding apparatus of a first embodiment of the invention for welding the reinforcement steel bars in a linear state, with specific reference to FIGS. 2 to 6. A pair of supporting girders 6,6 are placed on a foundation 5, and carry a mold device 7 and a welding gap setting device 8. The front and rear supporting girders 6 carry reversible feed devices 9, 10, respectively. These feed devices 9, 10 are adapted to array the reinforcement bars in a linear state. More specifically, the feed devices 9, 10 are adapted to insert and fix the reinforcement steel bars 1 to the mold device in advance to the welding and, after the jointing by welding, to forward the jointed or welded reinforcement steel bar, as will be detailed later.

A gate-shaped column 11 standing up from the foundation 5 is disposed above the feed device 10. A welder 12 for filling the welding gap 2 between the reinforcement bars 1 shown in FIG. 1 by an arc welding is disposed on the column 11 and the mold device 7.

Figure 3:
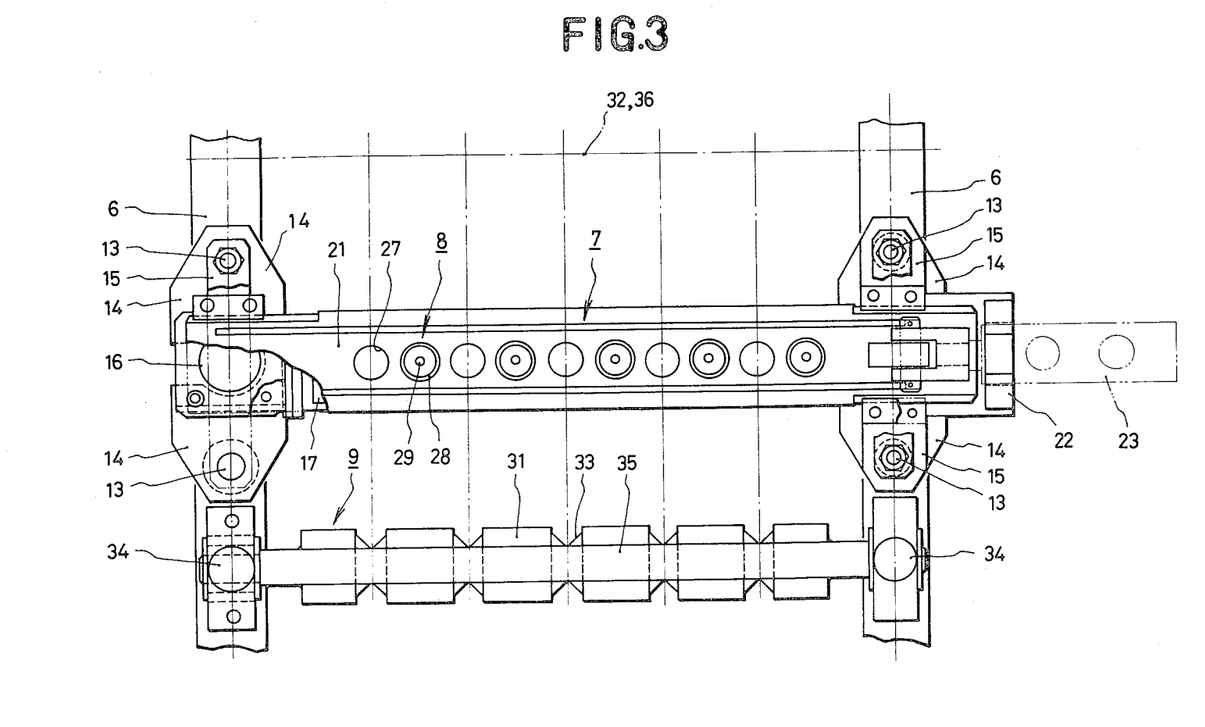
FIG. 3 is a plan view of an essential part of the apparatus shown in FIG. 2.
Figure 4:
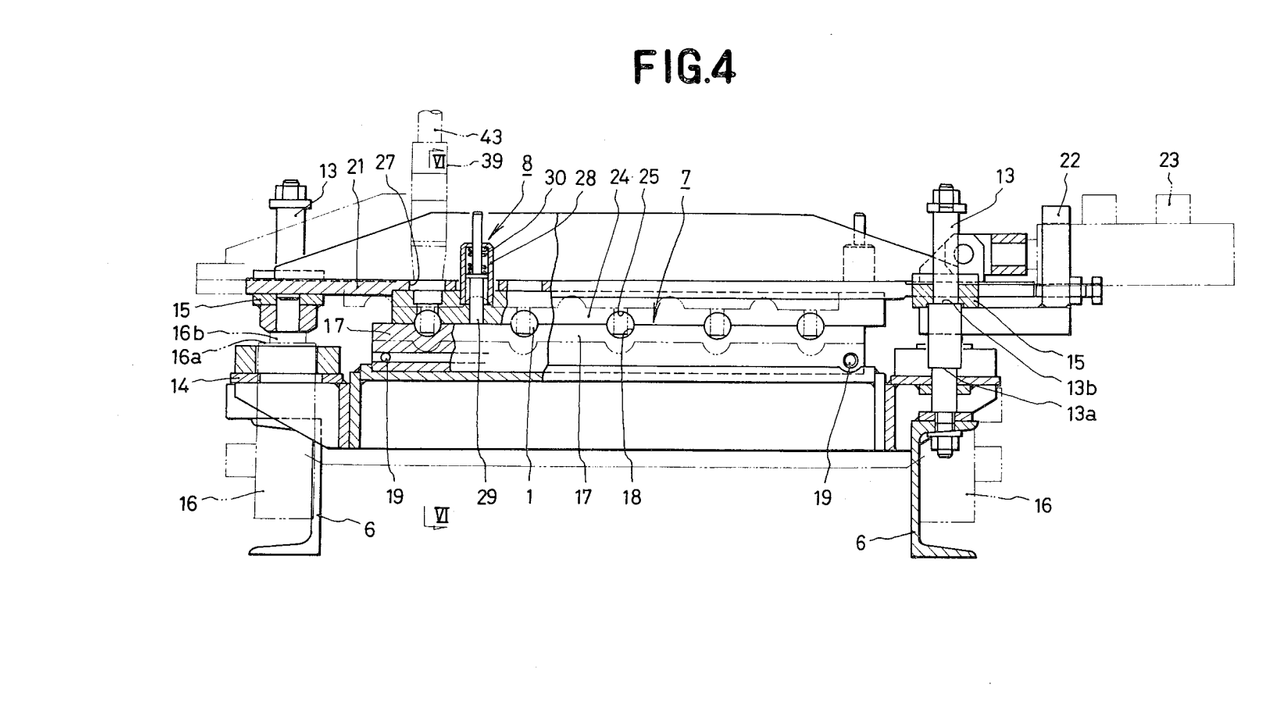
FIG. 4 is a front elevational view of an essential part of the apparatus shown in FIG. 3.
Figure 5:
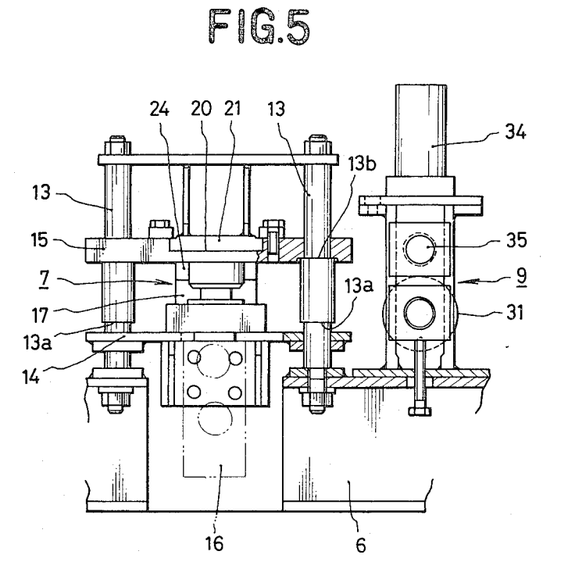
FIG. 5 is a side elevational view of an essential part of the apparatus shown in FIGS. 3 and 4.

Referring mainly to FIGS. 3 to 5 showing the mold device 7, four stepped guide bars 13 stand up from the supporting girders 6. A lower mold attaching base 14 is slidably fitted to the portions of the guide bars 13 between the lower step 13a and the supporting girder 6, while a sliding guide 15 is fitted also slidably to the portions of the guide bars above the upper step 13b, at each of left and right sides. The lower mold attaching base 14 and the sliding guide 15 at each side are connected by means of a cylinder 16. Namely, a cylinder portion 16a is fixed to the lower mold attaching base 14, while a piston rod 16b is connected to the sliding guide 15.

FIGS. 4 and 5 show the upper welding mold 24 and the lower welding mold 17 jointed at their opposing surfaces to clamp reinforcement steel bars 1. In this state, the cylinder 16 is in the retracting stroke.

Figure 7:
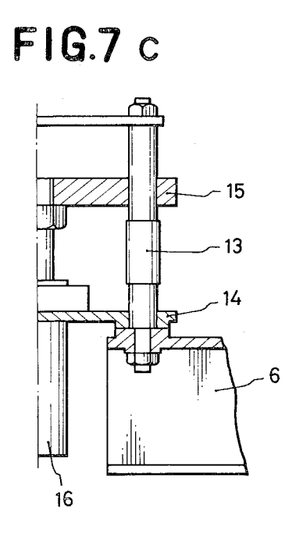

FIG. 7 shows the state of operation of the upper and lower welding molds 24, 17. For moving the molds apart from each other, the cylinder 16 shown in FIG. 7-a is switched to make a pushing stroke to raise the piston rod 16b as shown in FIG. 7-b. In consequence, the lower mold attaching base 14 is lowered until it comes into contact with the upper face of the supporting girder 6, by the weight of the lower welding mold 17 and the weight of the cylinder 16. (FIG. 7-c, FIG. 4)

In this state, the sliding guide 15 still remains on the upper steps 13b of the stepped guide bars 13, so that the sliding guide 15 starts to move upward, as shown in FIG. 7-c, from a moment at which the lower mold attaching base is contacted by the upper face of the supporting girder 6.

For minimizing the vertical gap between the lower mold attaching base 14 and the sliding guide 15, the cylinder 16 is switched to make a pulling stroke to lower the piston rod 16b. By so doing, the sliding guide 15 is lowered into contact with the upper step 13b of the stepped guide bar 13 so as to be supported by the latter (FIG. 7-b), so that the cylinder portion 16a and the lower mold attaching base 14 are raised to take the state shown in FIG. 7-a.

The lower welding mold 17 is fixed to the lower mold attaching base 14 which makes the above-described operation. Semicircular grooves 18 having a diameter meeting the annular ridge 3 of the reinforcement steel bar 1 are formed in the portion of the lower mold 17 opposing to the reinforcement steel bars. The number of the semicircular grooves corresponds to the number of the reinforcement steel bars. The lower mold 17 is provided a cooling water port 19 for connection of a cooling water pipe. In order to obtain a high cooling effect, the mold is made of a material having a high heat conductivity, preferably copper.

On the other hand, the right and left sliding guides 15 have guide grooves 20 formed in their upper faces, as shown in FIG. 5. These guide grooves fittingly receive an upper mold attaching base 21 adapted to move in the direction perpendicular to the longitudinal direction of the reinforcement steel bars 1. More specifically, the upper mold attaching base 21 is adapted to be moved horizontally by means of a cylinder 23 fixed to a bracket 22 (FIGS. 3 and 4), and is provided with the upper welding mold 24 fixed to the lower surface thereof.

Figure 9:
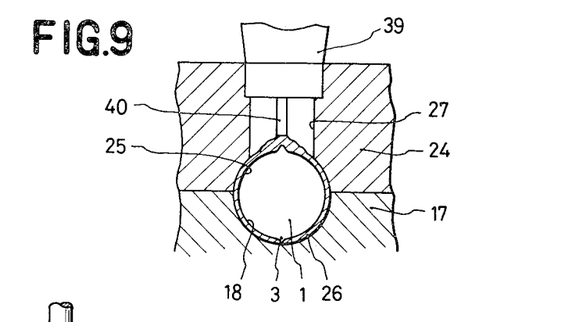
FIG. 9 is an illustration of the state of welding of metal in welding mold.

Semicircular grooves 25 complementary to those 18 of the lower welding mold 17 are formed in the lower surface of the upper welding mold 24. These semicircular grooves 18, 25, when they are met by each other, form circular grooves of a diameter substantially equal to the annular ridges 3 (FIG. 9) to preserve a gap 26 between the minimum diameter portion of the reinforcement steel bar 1 and the inner peripheral surface of the grooves 18, 25.

A bore 27 extending through the upper welding mold 24 is formed in the upper part of the grooves 25 so as to fittingly receive a welding torch 39 which will be detailed later.

The aforementioned welding gap setting device 8 is interposed between the grooves 18 and 25 of the upper welding frame 24 of the mold device 7 so as to cooperate with the latter.

The construction and operation of the welding gap setting device are as follows.

A bottom-equipped cylindrical pin case 28 extending through the upper mold attaching base 21 is fitted in an inversed posture to the upper part of the upper welding mold 24 through the upper mold attaching base 21, as will be seen from FIGS. 3 and 4. The pin case 28 receives a spacer pin 29 for free vertical sliding movement. The spacer pin 29 is constantly biased in the downward direction by a spring 30.

Figures 1, 2:
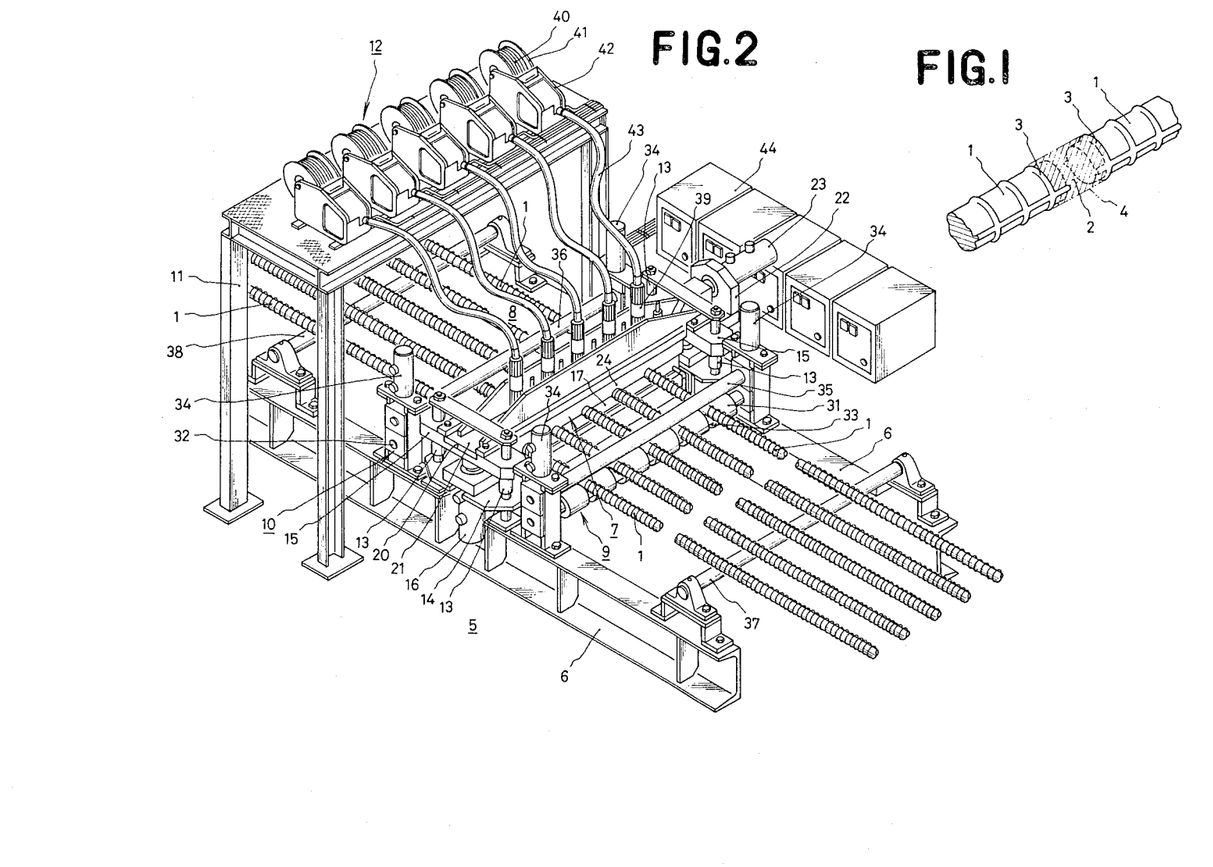
FIG. 1 is a perspective view showing the state of welding reinforcement steel bars in accordance with the invention.
FIG. 2 is a perspective view of the whole part of a welding apparatus in accordance with a first embodiment of the invention.

The diameter of the end portion of the spacer pin 29 corresponds to the axial size of the welding clearance 2 shown in FIG. 1, so that the spacer pin 29 maintains a constant welding gap 2 between the ends of the reinforcement steel bars 1 which are clamped in the grooves 18, 25 of the upper and lower welding molds 24, 17.

As to the feed devices 9, 10, referring to FIGS. 2, 3 and 5, positioning and feeding rollers 31, 32 are disposed beneath the reinforcement steel bars 1 to receive and feed and the latter back and forth, in the vicinity of the mold device 7. These rollers 31, 32 are provided with V-shaped grooves 33 (FIG. 3) at their portions opposing to the reinforcement steel bars 1 to receive several kinds of diameters of the reinforcement steel bars 1.

It is therefore possible to axially align the reinforcement steel bars 1, even when the diameters of the bars are changed, by receiving these bars in the V-shaped grooves 33 of the feed rollers 31, 32. In consequence, jointing of reinforcement steel bars of a different diameter can be achieved simply by replacing the upper and lower welding molds 24, 17 for aligning the bars in the vertical direction with the welding molds.

Meanwhile, pressing rollers 35, 36 adapted to be moved up and down by a cylinder 34 are disposed above the feed rollers 31, 32 to cooperate with the feed rollers in clamping therebetween the preceding and trailing reinforcement steel bars 1 thereby to fix the latter in the V-shaped grooves 33.

Also, guide rollers 37, 38 placed at suitable portions of the supporting girders 6 are adapted to support the reinforcement steel bars 1. (FIG. 2)

The front side feed device 9 is operatively connected to a driving device so as to drive the reinforcement steel bars 1 back and forth. In order to make the leading reinforcement steel bar 1 contact with the spacer pin 29 between the upper and lower welding molds 24, 17, the linearly welded unitary preceding bar 1 as a whole is moved aback into contact with the spacer pin 29. The spacer pin 29 has a function to align the ends of a plurality of pairs of reinforcement steel bars 1 clamped between the upper and lower welding molds 24, 17 at a time.

This aligning method is adopted to avoid the deviation of the welding positions of the plurality of rows of bars from one another, due to an accumulation of errors of length of each material bar which is usually as large as several.

Figure 6:
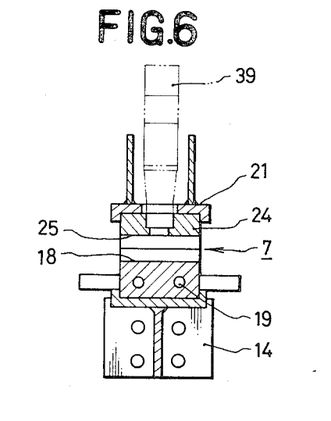
FIG. 6 is a sectional view taken along the line VI—VI of FIG. 4.

Hereinafter, the welding device 12 will be described with specific reference to FIGS. 2, 4 and 6.

The aforementioned welding torch 39 is fitted to the bore 27 of the upper welding mold 24, and the end of the torch 39 confronts the groove 25.

As will be seen from FIG. 2, the column 11 carries a reel 41 of welding wire 40 and a feeder 42 for feeding the wire 40. The wire feeder 42 and the welding torch 39 are connected to each other by means of a flexible tubular member 43 through which passed are a tube for feeding the wire 40, electric power supply cable, signal cable and tube for supplying carbon dioxide gas or argon gas.

A welding power supply 44 is disposed at one side of the supporting girder 6 to supply the necessary electric power to the welding torch 39.

Hereinafter, an explanation will be made as to how the reinforcement steel bars 1 are jointed by the welding apparatus having the described construction, mainly with reference to FIGS. 8-a to 8-f.

As shown in FIGS. 8-a and 8-b, the upper and lower welding molds 24, 17 are placed in an opened state with respect to the reinforcement steel bar 1 and the upper mold attaching base 21 is moved horizontally to the position of an imaginary line by means of the cylinder 23 to locate the spacer pin 29 of the welding gap setting device 8 at a position where the reinforcement steel bar 1 is located.

Figure 8A:
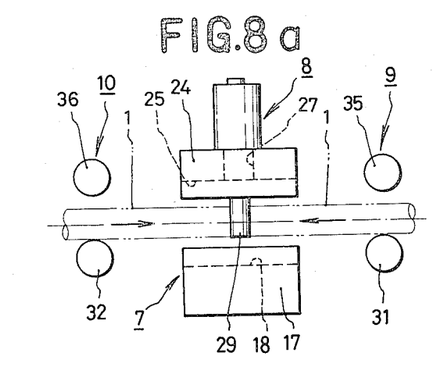
Figure 8B:
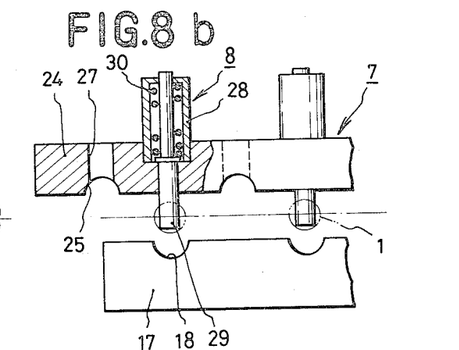
Figure 8C:
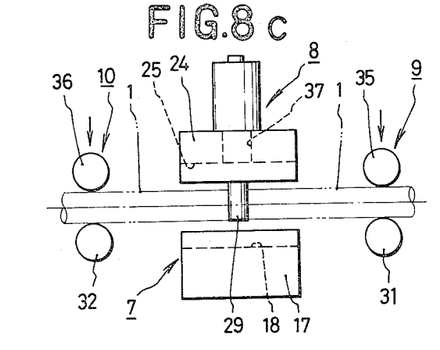

Then, the rear side feed device 10 is actuated to move the trailing steel bar 1 ahead and the front side feed device 9 is actuated to move the front steel bar 1 aback to bring the end surfaces of these bars into contact with the spacer pin 29. In this state, by using the stopper pin 29, the deviation of welding positions of plurality of rows of bars, attributable to accumulation of error of length of each material bar of the preceding welded bars, can be eliminated to make it possible to correctly position and align the welding points of all rows of the reinforcement steel bars 1. After bringing the end surfaces of the leading and trailing bars of respective rows into contact with the spacer pin 29, the feed devices 9, 10 are stopped. In consequence, as shown in FIG. 8-c, the positions of the preceding and trailing reinforcement steel bars 1 are fixed partly because the feed rollers 31, 32 are connected to the driving device and, accordingly, cannot rotate freely and partly because the pressing rollers 35, 36 above the feed rollers 31, 32 press the reinforcement steel bars 1 into the V-shaped grooves 33 of the feed rollers 31, 32.

Then, as shown in FIG. 8-d, the upper welding mold 24 is moved in the direction of arrow so that the spacer pin 29 is withdrawn from the gap between the end surfaces of the leading and trailing bars 1 and the semicircular grooves 25 of the upper welding mold are moved to the positions above the corresponding bars 1. Therefore, a predetermined welding gap 2 shown in FIG. 1 is formed between the end surfaces of the leading and trailing bars of each row.

Then, the cylinder 16 is actuated to make a pulling stroke as shown in FIG. 7-a to move the sliding guide 15 toward the lower mold attaching base 14, so that the upper and lower welding molds 24, 17 are brought together in a manner shown in FIGS. 8-e and 8-f.

To explain in more detail about the above-mentioned step of operation, the sliding guide 15 comes into contact with the upper step 13b of the guide rod 13, so that the grooves 25 of the upper welding mold 24 are fitted to the upper surfaces of the reinforcement steel bars 1 and then the grooves 18 of the lower welding mold 17 are fitted to the lower surfaces of the bars 1. In other words, the upper step 13b of each stepped guide rod 13 acts the position of jointing of the upper and lower welding molds 24, 17.

Through the above explained operation for positioning the reinforcement steel bars 1 and the operation for clamping the bars 1 by the grooves 25, 18 of the upper and lower molds 24, 17 a gap corresponding to the weld metal 4 becomes formed.

Figure 8D:
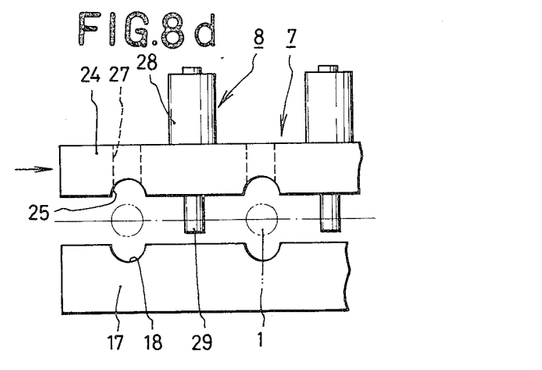
Figure 8E:
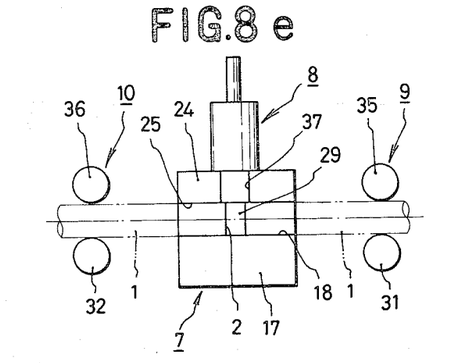
Figure 8F:
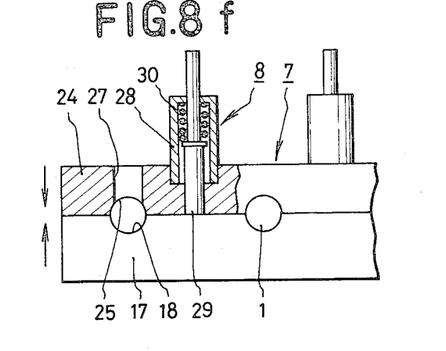

Subsequently, the weld metal in molten state supplied from the welding torch 39 to fill the welding gap 2 (See FIG. 8-e) and the gap 26 formed between the minimum-diameter protions of the bars 1 and the inner peripheral surfaces of the grooves 18, 25, thereby to weld the leading and trailing bars 1 of each row to each other. Subsequently, the upper and lower welding molds 24, 17 are opened as shown in FIGS. 8-c and 8-d and the bars 1 welded in a linear form are delivered forwardly to complete one cycle of welding operation. This cycle is repeatedly performed to form long continuous reinforcement steel bars 1 from unit material bars of a predetermined length.

Figure 10:
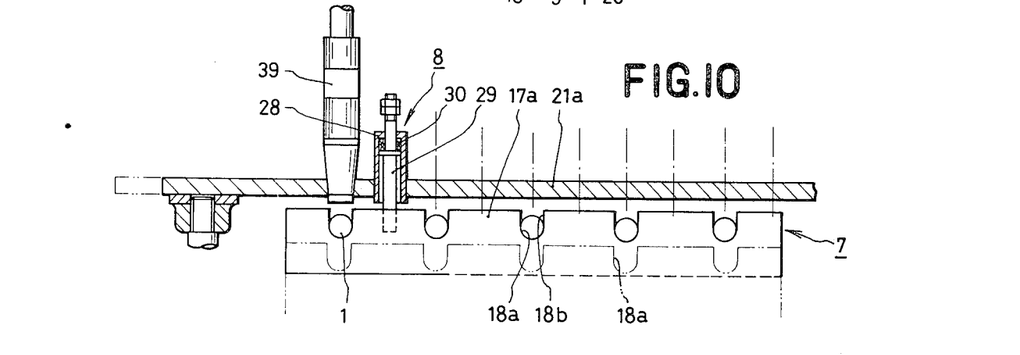
FIG. 10 is a sectional front elevational view of a welding apparatus of a second embodiment, showing the essential part thereof corresponding to that shown in FIG. 4.
Figure 11:
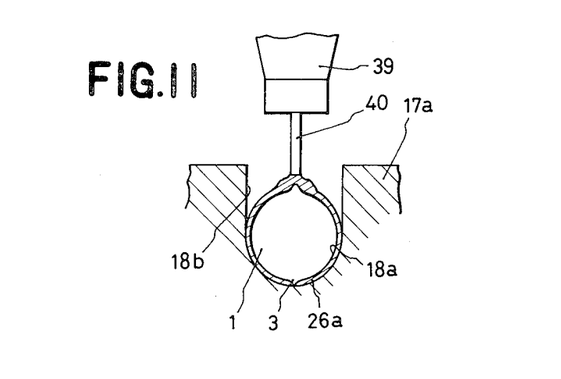
FIG. 11 is an illustration of the state of welding of metal in the embodiment shown in FIG. 10.

FIGS. 10 and 11 in combination show a second embodiment of the invention which is characterized in that the upper welding mold is omitted. More specifically, the lower welding mold 17a is provided with deep U-shaped grooves 18a to completely receive the reinforcement steel bars. These U-shaped grooves 18a have a sufficiently large depth to securely locate the reinforcement steel bars. In this embodiment, as in the case of the first embodiment, the welding gap setting device 8 is attached to the upper mold attaching base 21a.

A padding in a manner shown in FIG. 11 can be achieved by effecting the welding in such a manner that, when the molten weld metal flows into the gap 26a formed between the minimum-diameter portion of the reinforcement steel bar 1 and the inner peripheral surface of the groove 18a, the welding electric current is gradually weakened after the level of the molten metal has reached the upper surface of the reinforcement steel bars 1. The groove 18a has vertical portion 18b which prevents the molten metal flowing into the lateral sides of the reinforcement steel bar 1 from dropping.

By forming the grooves 18a of the lower welding mold 17a to have U-shape, the upper welding mold 24 can be omitted. Thus, the welding torch 39 and the welding gap setting device 8 are attached to a base 21a which corresponds to the upper mold attaching base 21 of the first embodiment.

Figures 12, 13:
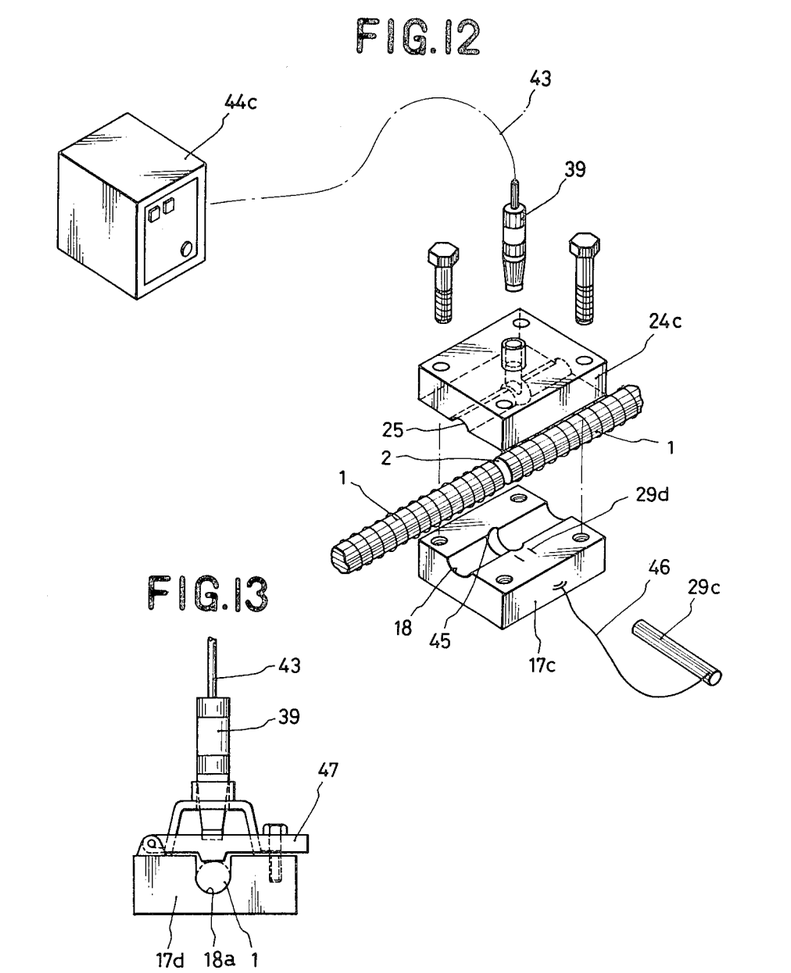
FIGS. 12 and 13 are a perspective view and a front elevational view of a portable welding apparatus in accordance with a third and a fourth embodiments of the invention.

FIG. 12 shows a third embodiment of the invention which is a portable type apparatus suitable for welding mere round bars instead of the reinforcement steel bars 1.

In this embodiment, the groove 18 formed in the central portion of the lower welding mold 17c is inflated as at 45 to form a space for padding. In this embodiment, the means for setting the welding gap between opposing ends of the bars 1,1 is constituted by a spacer pin 29c connected to the lower welding mold 17c by a cord 46. In operation, the spacer pin 29c is inserted between the opposing ends of the bars 1,1 to form a predetermined gap and, thereafter, the upper welding mold 24c is fixed to the lower welding mold 17c by means of bolts. Thereafter, the spacer pin 29c is withdrawn observing the positions of the bars 1,1 and the bolts are further tightened. Then, as in the case of the foregoing embodiment, the wire 40 fed into the welding torch 39 is molten by an arc through a welding power source 44c and charged into the gap 2. The welding gap 2 can be formed making use of marks provided in the lower welding mold 17c, instead of the spacer pin 29c.

FIG. 13 shows a fourth embodiment in which a U-shaped groove 18a is formed in the lower welding mold 17d to which pivotally secured is a holding member 47 by means of a hinge. In use, the bars are fixed in the groove 18a by means of the projection of the holding member 47.

The third and fourth embodiments shown in FIGS. 12 and 13 may be used as portable type apparatus of the first and second embodiments, for butt welding of already-laid reinforcement steel bars at the site of construction. In this case, the electric power supply 44c is placed at a position apart from the welding position, and the welding apparatus consisting mainly of the welding mold 24c, 17c or 17d are transported to any desired welding position for the butt welding of the reinforcement steel bars.

The characteristic of the invention resides in that two metal bars are placed and fixed in welding molds in such a manner that a predetermined welding gap is formed between opposing ends of two bars, and the gap is filled with welding wire melted by an arc, i.e. by an arc welding.

At the same time, the apparatus for carrying out the method of the invention is characterized by comprising at least one lower welding mold having grooves for fixing two bars with a predetermined welding gap between the opposing ends of these bars, and a welding gap setting device for setting the welding gap between the opposing ends of the metal bars.

As has been described, according to the invention, the straightening device which is necessary when a coiled material is used, as well as a specific electric power supply device used in an electric pressure welding, is eliminated. In addition, the welding time is remarkably reduced as compared with the gas pressure welding.

Namely, according to the invention, it is possible to produce long continuous metal bar efficiently and economically.

Furthermore, since the fragment of material due to cutting is eliminated, the waste of material is completely avoided. In addition, since the series of operation can be performed continuously, it is possible to mass produce the long reinforcement steel bars in a factory, remarkably reducing the cost of production.

It is also to be noted that the present invention permits the padding and butt welding in a simple way and precisely, because the welding is achieved by filling the welding gap between opposing ends of the bars fixed in the welding molds with the molten welding metal of wire. Thus, according to the invention, it is possible to obtain a welding of good appearance and uniform strength.

Finally, the present invention does not require any specific electric power supply device and the chance of occurence of trouble is small, because it makes use of an arc welding. The invention can be carried out in the form of portable welding apparatus which improves the efficiency of the work considerably.

What is claimed is:

1. A method of welding metal bars (1) and (1) together, comprising the sequential steps of:

projecting a spacer pin (29) at a prescribed point in a path through which metal bars (1 and 1) to be welded together are transferred, moving a first metal bar (1) rearwardly toward the spacer pin (29) by a first feed device (9) located in front of the spacer pin (29) and, simultaneously, moving a second metal bar (1) forwardly toward the spacer pin (29) by a second feed device (10) located rearwardly of the spacer pin (29) in a manner such that said first and said second metal bars (1 and 1) abut against the spacer pin (29) with a tail end and a nose end thereof respectively, moving the spacer pin (29) together with an upper welding mold (24) in a direction transversely of the metal bars to thereby leave a welding gap (2) formed between said tail and said nose ends of the metal bars (1 and 1), holding the tail and the nose ends of the metal bars (1 and 1) between said upper welding mold (24) and a lower welding mold (17) maintaining the gap, welding the tail and the nose ends of the first and the second metal bars (1 and 1) producing a continuous bar, releasing the continuous bar from the molds, and moving the continuous bar forwardly along the path by the action of the first and second feed devices.

2. A welding apparatus for welding metal bars (1 and 1), comprising:

rear feed means (10) essentially composed of rollers (32 and 36) for forwardly transferring a plurality of parallel disposed metal bars (1, 1), front feed means (9) disposed in a forward position of said rear feed means (10) and essentially composed of reversibly rotatable rollers (31 and 35) for forwardly and rearwardly moving a plurality of metal bars (1, 1) in a parallel disposed arrangement thereof, a mold device (7) disposed between said front feed means (9) and said rear feed means (10) essentially composed of an upper welding mold (24) and a lower welding mold (17), said upper welding mold (24) and said lower welding mold (17) respectively being provided with upper grooves (18) and lower grooves (25), for holding the metal bars (1, 1) between the same, welding gap setting means (8) mounted on said upper welding mold (24) in a central portion of said grooves (25) thereof and structured such that when said upper welding mold (24) and said lower welding mold (17) are transversely moved with respect to each other, a spacer pin (29) actuated by a spring (30) is projected downwardly from the upper molding mold (24), a plurality of welding torchs (39) mounted on the upper welding mold (24) at points thereof corresponding to the locations of the lower grooves (25), a first hydraulic cylinder (16) for driving the upper and the lower welding molds (24 and 17) to abut against each other or to separate from each other, and a second hydraulic cylinder (23) for shifting the upper welding mold (24) relative to the lower welding mold (17) transversely with respect to the metal bars.

3. A welding apparatus as claimed in claim 2, wherein V-shaped grooves (33) are formed around the periphery of the rollers (31 and 32) of the front and the rear feed means (9 and 10).

4. A welding apparatus as claimed in claim 2 further comprising a support girder (6), a plurality of stepped guide bars (13) disposed on the support girder, a sliding guide (15) slidably mounted on an upper portion of the plurality of guide bars (13), an upper mold attaching base (21) slidably mounted on the sliding guide (15) having the upper welding mold (24) fixed thereto, and a lower mold attaching base (14) slidably attached to a lower portion of the plurality of guide bars (13) having the lower welding mold (17) fixed thereto; and wherein the first hydraulic cylinder (16) has a cylinder portion (16a) fixed to the lower mold attaching base (14), a piston slidably mounted in the cylinder, and a piston rod (16b) connected at one of its ends to the piston and at the other to the sliding guide (15).

* * * * *